Feb. 2, 1937. N. H. CURTISS 2,069,197
METHOD AND APPARATUS FOR PROCESSING TUBULAR YIELDABLE OBJECTS
Filed May 18, 1934 2 Sheets-Sheet 1
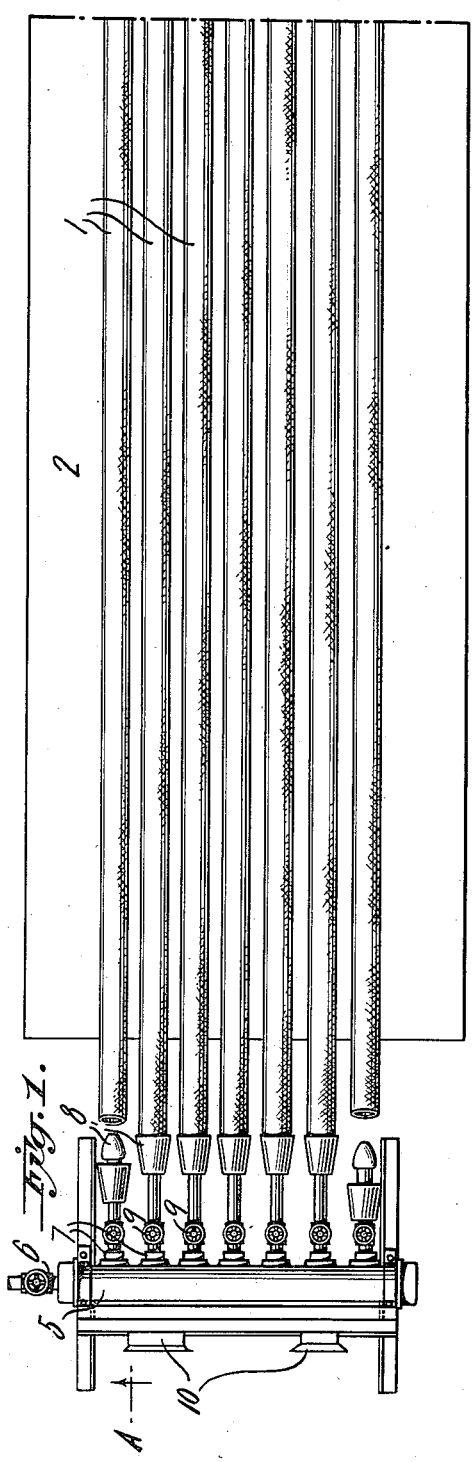
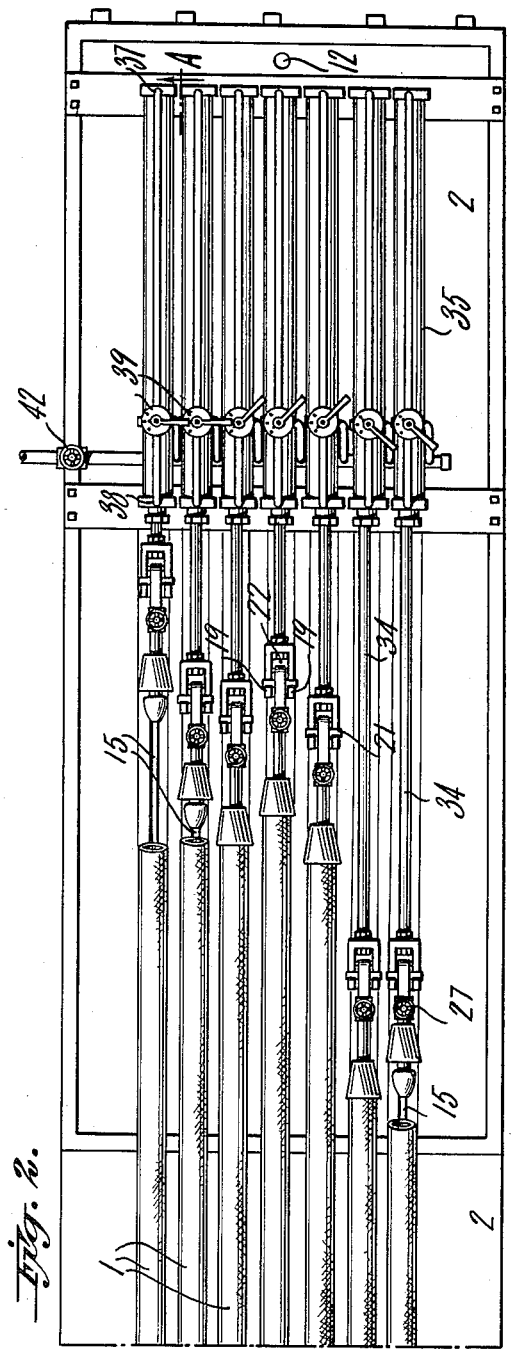
INVENTOR
NATHANIEL H. CURTISS
BY
ATTORNEY

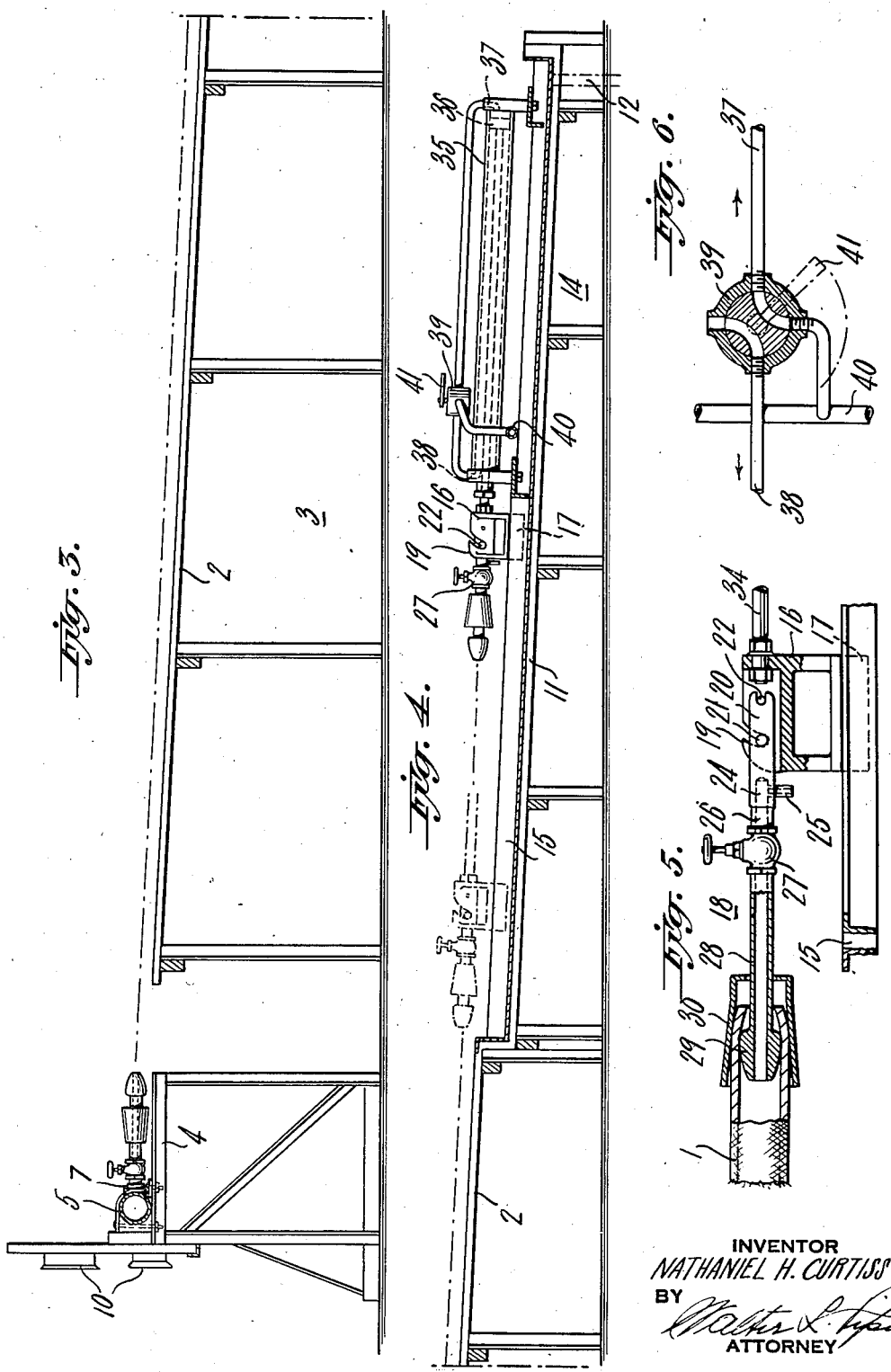

Patented Feb. 2, 1937

2,069,197

UNITED STATES PATENT OFFICE 2,069,197

METHOD AND APPARATUS FOR PROCESSING TUBULAR YIELDABLE OBJECTS

Nathaniel H. Curtiss, Passaic, N. J., assignor, by mesne assignments, to United States Rubber Company, New York, N. Y., a corporation of New Jersey Application May 18, 1934, Serial No. 726,278

7 Claims. (Cl. 18—6)

My invention relates to methods and apparatus for processing tubular yieldable objects and more particularly to methods and apparatus for curing or vulcanizing fabric covered rubber hose such as fire hose.

In the manufacture of many types of tubular objects a rubber tube is encased in one or more plies of fabric. In the case of fire hose the fabric tubing and the rubber tubing are prepared separately and the rubbing tubing is inserted in the fabric tubing before the rubber tubing is vulcanized or cured. During the curing operation, a curing fluid under pressure is admitted to the rubber tubing to expand it into tight engagement with the fabric cover. The fabric cover undergoes expansion both circumferentially and longitudinally. In the case of woven fabric such as is used for fire hose jackets the longitudinal expansion is of the order of several feet when a standard 50-foot length of hose is cured.

In curing such tubular objects it is usual to secure the opposite ends by quick detachable clamps and then circulate the vulcanizing or curing fluid under pressure. If the tube is initially tensioned between the clamps by an external pull, the elongation of the tube due to the internal pressure of the curing fluid is such that the initial external tension is released. Thereafter expansion of the tube circumferentially rather than longitudinally may take place. In order to reduce the cost of such hose it is desired that such expansion as takes place should take place longitudinally of the hose and thereby reduce the cost of the standard length of hose which is usually sold by the foot or yard.

By my invention I provide a method and apparatus by which the uncured tubular ends are clamped at their opposite ends and are placed in definite longitudinal pull or tension. The clamps are relatively movable so that as the tube elongates under the pressure of the curing or vulcanizing fluid the clamps separate by the amount of the elongation of the tube and thereby maintain a constant external tension on the tube and thus secure the benefit of the natural expansion in increased length.

The accompanying drawings illustrate a present preferred embodiment of apparatus for practicing the invention, in which:—

Fig. 1 is a plan view of one end of the apparatus; and

Fig. 2 is a plan view of the other end-view of the apparatus;

It is to be understood that the apparatus as a whole is shown by placing Figs. 1 and 2 in end-to-end position;

Fig. 3 is a side elevation of a portion of the apparatus shown in Fig. 1;

Fig. 4 is a side elevation of the apparatus shown in Fig. 2;

Figs. 3 and 4 when placed in end-to-end position, may be considered as a sectional view taken along the section line A—A in Figs. 1 and 2;

Fig. 5 is a view partly in elevation and partly in section of the clamping mechanism; and Fig. 6 is a sectional view of a control valve.

Referring to the drawings, a plurality of tubular yieldable objects 1 such as lengths of fabric jacketed fire hose are mounted on a table 2 supported by a frame work indicated generically by the numeral 3. At one end of the table there is a platform 4 supporting a header 5 which is connected by a regulating valve 6 to a source of vulcanizing or curing fluid, such as steam or a gas. The header 5 has a plurality of outlets 7 to which are attached coupling devices 8 for the quick attachment of one end of the tubular objects 1. The details of the clamps 8 are similar to the clamps hereunder described in connection with Fig. 5. Regulating valves 9 are disposed between the outlet 7 and the clamps 8 to control movement of fluid under pressure from the header 5 to such tubes as may be connected to one or more of the clamps 8. Suitable gauges 10 for indicating pressure and the like may be associated with the platform 4.

Referring to Figs. 2 and 4, at the opposite end of the apparatus there is a bed 11 which is connected to the table 2 and forms a continuation thereof. Preferably the table 2 and the bed 11 slope downwardly from the platform 4 so as to cause the condensate in the hose lengths 1 and/or on the platform or bed to flow downwardly to an associated outlet 12 at the lower end of the bed 11. The bed 11 is supported by trestle work 14 and is provided with a plurality of slots 15, the number of slots 15 correspond with the number of lengths which may be handled by the apparatus at any time. Crossheads 16, each having a tongue 17 slidable in a slot 15, are disposed on the bed 11.

As shown in Fig. 5 each cross-head 16 is provided with means for quickly attaching clamp unit 18. A preferred form of such quick attaching means comprises spaced hooks 19 between which a bar 20 extends. Pins 21 on the bar are held by the hooks 19. The end of the bar 20 is indented to engage a pin 22 secured between the hooks 19 so as that the bar 20 has an upward turning motion in engaging and disengaging the hooks 19. The forward end of the bar 20 is provided with a bore 24 of L-shape. A discharge pipe 25 is directed downwardly from one end of the bore for charging condensate, and a pipe length 26 having a regulating valve 27 connected thereto for controlling the movement of the fluid is connected to the other end of the bore. A pipe 28 is connected to the other side of the valve 27 and terminates in an enlarged head 29 which is inserted within one end of the tube or hose 1. A belt or thimble 30 having an outwardly flaring opening is loosely mounted on the pipe 28 behind the head 29. When the bell 30 is driven outwardly, as shown in Fig. 5, the hose end is tightly clamped between its inner surface and the surface of head 29. For detaching the hose the bell is driven rearwardly along the pipe 28. The details of the clamp 8 are similar to those of the clamp described in Fig. 5, except that the clamps 8 are permanently connected to the header 5.

Each cross-head 16 is attached to a piston rod 34 which extends into a cylinder 35. A piston 36 is carried by each piston rod 34. Each cylinder 35 is provided with a rear port 37 and a forward port 38 for admitting or discharging fluid so as to control the position of the associated coupling.

Control valves 39 are connected to a pipe line 40 for selectively supplying fluid under pressure to each of the cylinders through the ports 37 and 38 for manipulating of a lever 41 in a manner well understood in the art, as illustrated in Fig. 6.

In utilizing the apparatus the desired number of lengths of the tubular stock are laid on the table 2, the upper ends are attached to the couplings 8 and the necessary number of cylinders 35 are energized to advance their associated couplings along the slots in bed 11 toward the raised portions of the table 2, or to the dotted line position shown in Fig. 4. The lower ends of the tubes are then attached to the couplings 29 and 30. The valves 39 are then manipulated to retract the lower couplings to intermediate positions such as are shown in Fig. 2. This takes up the slack on the tubes and leaves them under a definite tension or pull in accordance with the pressure being admitted through the several ports 38 to the cylinders 35. The valves 27 are set to give the desired flow and the valves 9 are opened to permit the flow of curing fluid. If steam is used the condensate flows down the tubes and out of the pipe 25. As the curing fluid is admitted the tubes expand. This is particularly the case if rubber tubes are extended against a woven fabric backing or jacket as in the case of fire hose. By reason of the fact that a constant tension or pull is exerted on each length, the expansion takes place longitudinally rather than circumferentially. The increase in length is desired rather than an increase in diameter, as such hose is sold in standard lengths. This results in economy in the use of stock, particularly in the amount of stock used in the woven jackets.

At the end of the curing operation the valves 9 are closed. Pressure on the several pistons is relieved. A control valve 42 may be placed in the pipe line 40. If desired the lower clamps may be advanced slightly to relieve the tension on the lengths. The clamps at the ends of the lengths are then released and the cured lengths are removed from the table 2. With this apparatus and method each tubular object may be held under the same or different constant external tension or pull during the curing operation independently of the pull on any other tubular object. Such increase in size as occurs by reason of the internal pressure is converted into additional length by reason of the persistent pull exerted on the hose during the curing operation. By using various sizes of couplings, tubes of different diameters may be used in the apparatus.

While I have shown and described a present preferred embodiment of the invention and method of practicing the same, it is to be understood that the invention may be otherwise embodied and/or practiced within the spirit of the invention and the scope of the appended claims.

Having thus described my invention what I claim and desire to protect by Letters Patent is:—

1. The method of curing tubular vulcanizable objects, comprising the steps of admitting curing fluid into said objects and building up a pressure therein, and elongating each object under uniform tension while it is being cured.

2. The method of curing tubular vulcanizable objects, comprising the steps of admitting curing fluid into said objects and building up pressure therein, and independently elongating each object under predetermined uniform tension while it is being cured.

3. The method of curing tubular objects each having a fabric jacket and a rubber lining therein, comprising the steps of passing curing fluid through said objects and building up pressure therein and constantly elongating each object under predetermined uniform tension while it is being cured.

4. The method of curing hose having a fabric jacket and a tubular rubber lining therein, comprising the steps of passing curing fluid through the hose and building up internal pressure therein, and constantly and independently elongating each hose under uniform tension while it is being cured under the internal curing pressure, whereby each hose is elongated independently of the resistance offered by any other hose that may be cured at the same time.

5. An apparatus for processing a tubular object having a fabric cover and a vulcanizable rubber lining, said apparatus comprising a stationary header containing a vulcanizing fluid; means for connecting and securing one end of such object to said header so that the vulvanizing fluid may be admitted inside of the object, means for applying a constant predetermined pull to the other end of such object to elongate same while the rubber lining is being vulcanized by the vulcanizing fluid admitted internally thereof, and means for supporting the object, said last named means being constructed and arranged to permit the free elongation of the object over substantially the entire length thereof and while the same is being vulcanized by the vulcanizing fluid admitted internally thereof.

6. Apparatus for processing tubular vulcanizable objects comprising a header, a plurality of clamps connected to said header for engaging the ends of tubular objects, separate clamps spaced from the first mentioned clamps, said header and clamps providing continuous passageways for a vulcanizing fluid through said objects when connected between the clamps, and a separate means cooperating with each of said movable clamps for maintaining each of the objects under constant uniform tension independently of the other for elongating each object during the passage of the vulcanizing fluid.

7. In apparatus for processing tubular articles, a stationary head containing a vulcanizing fluid, means for connecting and securing one end of each article to said head so that the fluid may be admitted inside thereof, a bed having a plurality of slots formed therein, a plurality of cylinders cooperating with said bed in alignment with said slots, a cross-head slidable in each slot, a piston rod connecting each cross-head to a cylinder, one clamp only associated with each cross-head for detachable connection to the other end of each tubular article whereby the positions of the several clamps may be controlled in accordance with the several lengths of the tubular bodies attached thereto.

NATHANIEL H. CURTISS.